Patented June 30, 1931

1,812,306

UNITED STATES PATENT OFFICE

ARTHUR J. RUSS, OF OAKDALE, PENNSYLVANIA, ASSIGNOR TO ARMSTRONG CORK COMPANY, OF PITTSBURGH, PENNSYLVANIA, A CORPORATION OF PENNSYLVANIA

INSULATING MATERIAL

No Drawing.   Application filed May 8, 1926.   Serial No. 107,790.

This invention relates to insulating material and particularly to an insulating material formed from diatomaceous earth.

Insulating material of this character is usually made up into blocks which may be used for various purposes. The usual mix comprises diatomaceous earth, hydrated lime and a small amount of a suitable material such as asbestos.

I have found that an insulating block of highly desirable characteristics may be obtained by adding to the mix an aggregate material which forms a surface bond with the lime and diatomaceous earth. Preferably this material is in the form of plate-like particles, such as may be secured by utilizing a micaceous material. More specifically I prefer to use a mica of the vermiculite group, such as jefferisite. This material is found in large deposits and the chief characteristic of the material is that when it is heated to a moderate temperature it exfoliates, giving rise to very light weight plate-like particles, which are highly desirable in a mix of this character.

The use of such an aggregate material greatly improves the quality of the insulating blocks. The ordinary diatomaceous earth block begins to check at about 1000° F. and crumbles at a somewhat higher temperature. There is a demand for an insulating block capable of standing up to about 2000° F. for use around steam boilers, oil refineries and the like. The ordinary calcined materials are not satisfactory for such work, as they come in relatively small sizes, whereas blocks made from my new material may be made very large.

As above stated, jefferisite is one of the vermiculite group and chemically is an aluminum magnesium silicate. It is found in mica-like form and when moderately heated, it puffs to about fifteen times its original volume. It is the puffed-up jefferisite which I use in my mix. I have found that it forms a surface bond with the material, and provides a block of high structural strength.

A desired formula is as follows:

|   | Per cent by weight |
|---|---|
| Diatomaceous earth | 27.5 |
| Jefferisite | 40.6 |
| Hydrated lime | 27.5 |
| An asbestos which will withstand high temperature, such as African brown fibre | 4.4 |

It will be noted that the diatomaceous earth and the hydrated lime are used in substantially equal amounts. The proportions may of course be varied, but I prefer to use more than about ten percent hydrated lime or diatomaceous earth. The African fibre is of value in strengthening the block. For a high temperature block it is preferable to use an African fibre, that is, either a blue fibre or an amosite, in preference to Canadian or American fibres. Analysis shows that the African fibres contain a large amount of ferric or ferrous oxides, and a relatively small amount of combined water, while the Canadian and the American fibres contain a considerably greater quantity of combined water, a relatively small amount of ferric oxide and generally no ferrous oxide whatever. On this account the African fibres are far more desirable in mixes for blocks to be used at high temperatures, but it will be understood that the other fibres may be used in blocks manufactured according to my invention and used for other purposes. Instead of using hydrated lime, quicklime may be employed if desired. Other alkaline earths, such as magnesium, may be employed.

A block made from the above formula is a little lighter than the ordinary diatomaceous earth block, but instead of the chalky white appearance of the ordinary block, it has a slight color and the jefferisite employed in the mix shows up throughout the mix as golden brown particles. The block will withstand materially higher temperatures than the ordinary block without checking or cracking, and is therefore capable of far more extended and severe uses. Another advantage of my improved block is the fact that it is better adapted for commercial handling than the ordinary diatomaceous earth block. It can be sawed, and subjected to other manufacturing processes, and experience shows that the amount of breakage and cracking during manufacture is materially smaller than in the case of the ordinary blocks. On this account my improved block has advantages over the usual block other than the fact that it is also capable of withstanding higher temperatures.

The block may be made up in the ordinary way by mixing the materials with water, running the mud into molds and subjecting the blocks thus formed to steam induration.

I have used the term "block" herein as a term of general definition and not of limitation, and intend thereby to include not only rectangular blocks, but also specially shaped articles, such as pipe covering, still and boiler covers, insulating discs for electrical apparatus, and the like.

I have described a preferred embodiment of my invention, but it will be understood that it is not thus limited, as it may be otherwise embodied within the scope of the following claims:

I claim:

1. An insulating material comprising a mixture of an alkaline earth, diatomaceous earth and an exfoliated vermiculite mineral.

2. An insulating material comprising a mixture of an alkaline earth, diatomaceous earth and exfoliated jefferisite.

3. An insulating material comprising exfoliated jefferisite and a diatomaceous earth mix.

4. An insulating material comprising a mixture of an alkaline earth, diatomaceous earth and an exfoliated vermiculite mineral, the alkaline earth constituting more than about 10% of the mix.

5. An insulating material comprising a mixture of an alkaline earth, diatomaceous earth and an exfoliated vermiculite mineral, the alkaline earth and the diatomaceous earth being in substantially equal amounts.

6. An insulating material comprising a mixture of an alkaline earth, diatomaceous earth, an exfoliated vermiculite mineral and an asbestos which will withstand high temperatures.

7. An insulating material comprising a mixture of an alkaline earth, diatomaceous earth, an exfoliated vermiculite mineral and a fibrous material.

8. An insulating material comprising a mixture of an alkaline earth, diatomaceous earth and an exfoliated vermiculite mineral, the vermiculite mineral being present in an amount which is in excess of the other materials comprising the mix.

9. An insulating material comprising about 27% by weight of diatomaceous earth and about the same amount of an alkaline earth, substantially all of the remainder of the block being an exfoliated vermiculite mineral.

10. An insulating material comprising a mixture of about 27% by weight of diatomaceous earth, about 27% of an alkaline earth and about 4% of an asbestos which will withstand a high temperature, substantially all of the remainder of the mix being an exfoliated vermiculite mineral.

11. An insulating material comprising about 40% of an exfoliated vermiculite mineral, substantially all of the remainder of the mix being diatomaceous earth and an alkaline earth in equal amounts.

12. An insulating material comprising about 40% of an exfoliated vermiculite mineral, substantially all of the remainder of the mix being diatomaceous earth and an alkaline earth in equal amounts, the mixture also having a small amount of fibrous material.

13. An insulating material comprising a mixture of about 27% by weight of diatomaceous earth, about 27% of a hydrated alkaline earth and about 4% of a fibrous material, substantially all of the remainder of the mix being an exfoliated vermiculite mineral.

14. An insulating material comprising a mixture of lime, an exfoliated material of the vermiculite group, diatomaceous earth and a fibrous material.

15. The process of forming an insulating block which consists in mixing a diatomaceous earth, exfoliated vermiculite, and lime, molding the mix, and subjecting the blocks to steam induration.

16. The process of forming an insulating block which consists in mixing a diatomaceous earth, an exfoliated vermiculite, a fibrous material, an alkaline earth bonding material, molding the mix, and subjecting the block to steam induration.

17. A heat insulating material which includes vermiculite material, diatomaceous earth and a binder.

In testimony whereof I have hereunto set my hand.

ARTHUR J. RUSS.